United States Patent

[11] 3,596,741

[72] Inventor Haruo Miyajima
     Kariya-shi, Japan
[21] Appl. No. 826,111
[22] Filed May 20, 1969
[45] Patented Aug. 3, 1971
[73] Assignee Aisin Seiki Company Limited
     Kariya-shi, Aichi-ken, Japan
[32] Priority May 25, 1968
[33] Japan
[31] 43/43384

[54] DRUM BRAKE ASSEMBLY INCLUDING PLURAL OPERATOR
     5 Claims, 3 Drawing Figs.
[52] U.S. Cl. .................................................. 188/152, 188/106
[51] Int. Cl. ................................................... B60t 11/16, F16d 65/24
[50] Field of Search .......................................... 188/152.81, .02, 106 P

[56] References Cited
UNITED STATES PATENTS
2,382,927  8/1945  Whitacre .................. 188/152 (.81)
FOREIGN PATENTS
548,256  6/1956  Belgium .................. 188/152 (.02)

Primary Examiner—George E. A. Halvosa
Attorney—Sughrue, Rothwell, Mion, Zinn & Macpeak ABSTRACT: A drum brake assembly for powered vehicle, said assembly comprising two independently operable hydraulic piston-and-cylinder units for operating a pair of brakeshoes for expanding, said assembly being characterized by that the parallel hydraulic pistons are kept in mechanical engagement with one of said shoes and the oppositely outer end of said wheel cylinders is kept in mechanical engagement at a plurality of points with the remaining one of said shoes and said engaging points are positioned on the respective extensions of the longitudinal axes of said hydraulic pistons, for minimizing otherwise possible development of severe turning moment acting upon the hydraulic cylinder means for the both pistons.

DRUM BRAKE ASSEMBLY INCLUDING PLURAL OPERATOR

This invention relates to improvements in and relating to drum brakes for powered vehicles.

More specifically, it relates to improvements of the drum brake assembly which comprises: a backing plate mounted fixedly on a nonrotational part of said vehicle; a brake drum rotatable with one of said wheels and mounted in proximity of said backing plate; anchor means mounted on said backing plate; a pair of expandable brakeshoes pivotably supported thereon, the pivoting motion of each of said shoes being performed about its one end which is supported by said anchor and said shoes coacting with said brakedrum when they are brought into their expanded position; a wheel cylinder unit movably mounted on said backing plate and between other ends of said shoes, said unit comprising in turn a plurality of hydraulic piston-cylinder units arranged in parallel to each other and connected to respectively independent hydraulic actuating systems.

The provision of a plurality of parallel-arranged hydraulic piston-cylinder units has such an object that even when any one of the independently actuatable hydraulic units should fail to operate from certain or other reason, the braking system can be safely operated without inviting a grave risk of brake failure.

It has been experienced however that upon failure of operation of any one of said independent hydraulic units the wheel cylinder can be subjected to a considerable amount of turning moment relative to the backing plate mounting the latter, resulting in a damage of the connecting means between the both and in a operational failure of the brake.

It is therefore the main object of the present invention to provide a drum brake assembly capable of substantially to obviating said kind of conventional drawback, thus allowing a reliable, accurate and efficient operation of the wheel cylinder for the brakeshoes.

A further object is to provide a drum brake of the above kind which is compact in its whole design and arrangement, reliable in its operation and easy and manufacture thereof.

These and further objects, features and advantages of the invention will become more apparent when read the following detailed description on a preferred embodiment thereof by reference to the accompanying drawing which constitutes a part of the present specification.

Figure 1:
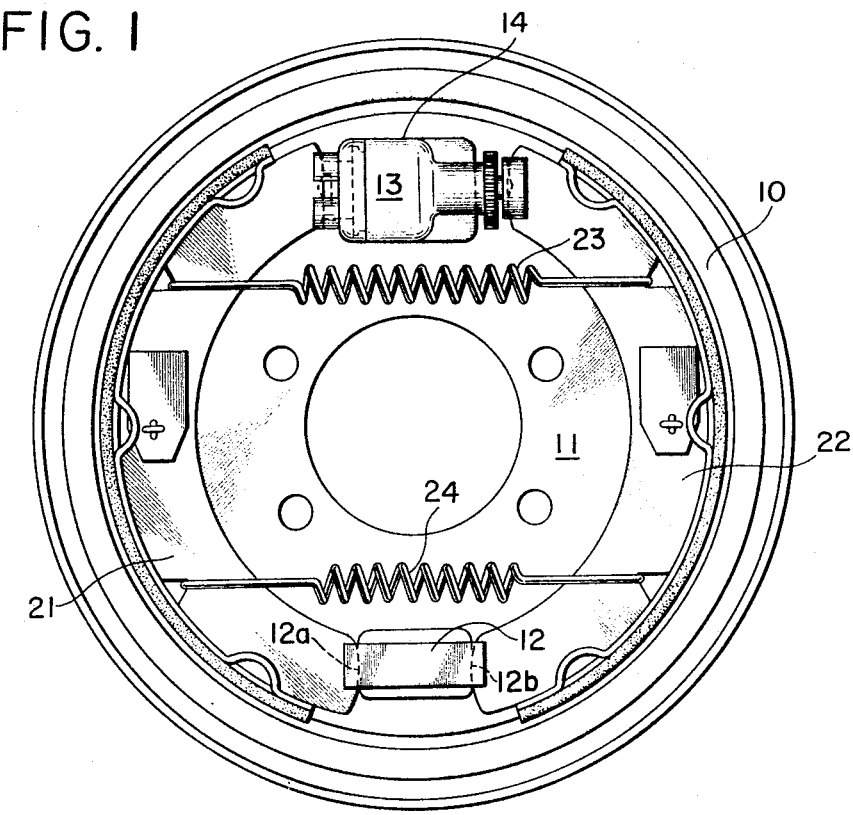
FIG. 1 is a schematic front view of the drum brake.

Referring now to the accompanying drawing, the numeral 10 represents a conventional brakedrum which is arranged to rotate with an automotive wheel, not shown, and the numeral 11 denotes a conventional backing plate which is fixedly mounted on a nonrotatable part of the powered vehicle, such as the conventional automotive rear axle housing, not shown. Stationary anchor 12 is fixedly mounted on the backing plate which mounts in turn slidably the cylinder body at 14 of a hydraulic wheel cylinder assembly 13. The sliding movement of the cylinder body 14 is performed to the left or to the right when seen in FIG. 1. This slidable construction of said cylinder body 14 is most clearly seen from FIG. 3.

Figure 2:
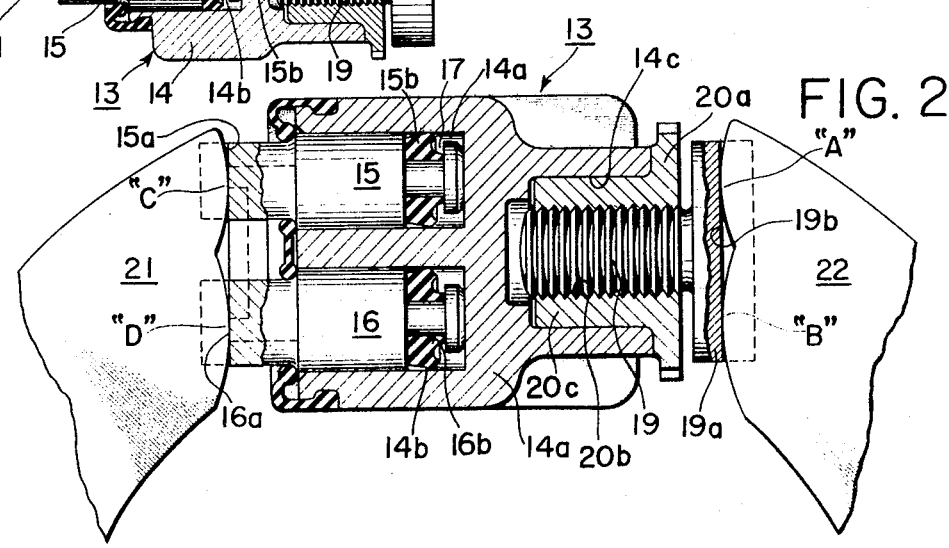
FIG. 2 is an enlarged axial sectional view of a wheel cylinder unit employed in the brake shown in FIG. 1.

As seen especially from FIG. 2, the cylinder body 14 is formed with a pair of axial hydraulic cylinder bores 14a and 14b and a further axial bore 14c the imaginary axis thereof is parallel to the imaginary axes of said cylinder bores and extends between said bore axes with equal lateral distances therefrom. When axially seen, the open ends of said bores 14a and 14c direct in opposition to that of the axial bore 14c.

Hydraulic pistons 15 and 16 are slidably received in said cylinder bores 14a and 14b, respectively, so as to provide respective hydraulic chambers 17 and 18 which are hydraulically connected with respective independent hydraulic systems, although not specifically shown.

A bolt member 19 is received threadingly in a nut member 20 which comprises a sprocket wheel part 20a and a stem part 20c, the latter being rotatably received in said axial bore 14c. The nut stem 20c is formed with a female-threaded axial bore 11b which is kept in meshing threadedly with the male-threaded stem of the bolt member 19 having a head 19a formed with an elongated groove 19b.

There are provided a pair of left-hand and right-hand brakeshoes 21 and 22 having respective frictional linings 21a and 22a, respectively. The right-hand brakeshoe 22 is formed on its upper and inner edge with two separated, yet relatively closely arranged projections "A" and "B" which are kept in pressure contact with the bottom of said elongated groove 19b. In the similar way, the left-hand brakeshoe 21 is formed on its upper and inner edge with two separated, yet relatively closely arranged projections "C" and "D" which are kept in pressure contact with respective reception grooves 15a and 16a formed on the outer ends of said hydraulic pistons 15 and 16, respectively. As will be easily supposed, the upper projections "A" and "C" are arranged in opposition and in registration to and with each other when seen in the axial direction of the wheel cylinder assembly 13. The same is applied to the lower projections "B" and "D." The The lower and inner ends of the brakeshoes 21 and 22 are received pivotably and slidably in the respective grooves 12a and 12b formed on tee fixedly mounted anchor 12. Contacting points of upper projections "A" and "C" are situated on the extension of the axis of the upper hydraulic piston 15. In the similar way, contacting points of lower projections "B" and "D" are situated on the extension of the axis of the lower hydraulic piston 16.

When it be now assumed that the upper and inner edge of the right-hand shoe 22 is kept in pressure contact with the bolt head 19a and further that either of the hydraulic pressure systems for pistons 15 and 16 be failed to operate, the cylinder body 14 would be subjected to a considerable amount of turning moment during a hydraulic expansion stroke of the brakeshoes 21 and 22 which may result in a failure of the mounting connection between the cylinder body and the backing plate. This drawback could lead frequently the failure of the braking function, resulting in a grave traffic accident. The presence of said turning moment is caused by the offset arrangement of the line of the acting force imposed by either of said hydraulic pistons 15 and 16 upon the left-hand brakeshoe 21 so as to expand the latter against the rotating brakedrum 10, from the line of the actuating force imposed by the reactive movement of cylinder body 14, being transmitted through the bolt member 19 to the right-hand brakeshoe 22 which is thus urged to expand against the same brakedrum.

By the provision of each two motion-receiving projections "A" and "B" and "C" and "D," respectively on either of said brakeshoes 21 and 22 and by adopting such unique arrangement that the upper opposite pair of them "A" and "C" or the lower opposite pair of them "B" and "D" are arranged in registration with each other along the line of hydraulic actuating force delivered from the respective hydraulic piston cylinder unit capable of acting independently, the aforementioned defective development of the disadvantageous turning moment caused by an occasional failure of either independent shoe-expanding hydraulic piston-cylinder unit can be reduced to a possible minimum. This advantageous operational feature is also applied to the case when the sprocket wheel 20a with its integral nut stem 20c is turned to and fro for the adjustable establishment of the effective brake gaps for the brakeshoes 21 and 22.

Additionally, these shoes 21 and 22 are normally kept in their contracted state shown by the provision of two tension springs 23 and 24 which are bridged therebetween as shown in FIG. 1 and as in the conventional way. By the provision of these springs, the shoes are removed from the brakedrum 10 when the hydraulic shoe-expanding force has been released. Hydraulic pistons 15 and 16 are provided with sealing means 15b and 16b, respectively, the purpose of which may be self-explanatory.

Figure 3:
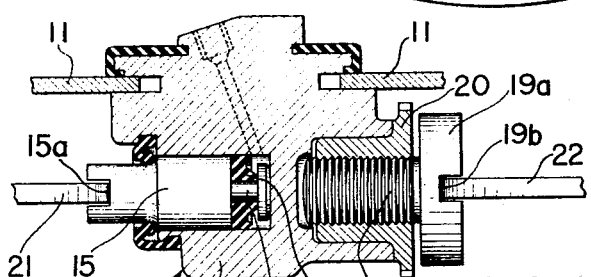
FIG. 3 is a further longitudinal sectional view of the wheel cylinder unit, the section being taken along a sectional plane which is perpendicular to that which is employed in the case of FIG. 2, wherein however the section has been drawn on a considerably reduced scale in comparison with that employed therein.

In the operation of the drum brake so far shown and described, when the vehicle driver depresses a conventional foot-operated brake pedal, not shown, for the purpose of performing a regular braking operation, pressure oil is conveyed from a master cylinder, not shown, through respective piping systems, again not shown, to the respective working chambers 17 and 18 of the both hydraulic units, thereby the respective pistons 15 and 16 being urged to move leftwards in FIGS. 1— 3, and the left-hand brakeshoe 21 being thereby expanded against the rotating brakedrum 10. Almost simultaneously therewith, the cylinder body 14 is moved rightwards in FIG. 1 by the existence of a hydraulic reaction force transmitted thereto and movement being further transmitted therefrom through bolt member 19 to the right-hand shoe 22 which is thus urged to expand against the brakedrum. In this way, both shoes 21 and 22 are applied under pressure against the drum so that a braking operation is carried thereby into effect.

Even when either hydraulic unit should fail to function, the required braking operation can be performed in the above-mentioned manner and without inviting undue stress in the attaching means of the cylinder body to the backing plate, by virtue of the provision of two motion-receiving projections arranged in the above-mentioned way for each brakeshoe. This means a considerable progress in the art.

Although the number of the hydraulic piston-cylinder units have been shown only to be two. It is naturally that the number of these units can be increased to three or more, when occasion may desire.

I claim:

1. A drum brake assembly for a powered vehicle provided with a plurality of wheels comprising:
   a. a backing plate for each of said wheels mounted fixedly on a nonrotatable part of said vehicle;
   b. a brakedrum rotatable with each of said wheels and mounted in proximity to said backing plate;
   c. anchor means mounted on said backing plate;
   d. a pair of expandable brakeshoes pivotably mounted at their respective one end to said anchor means;
   e. a single cylinder body mounted on said backing plate and slidably supported between the other ends of said brakeshoes, said cylinder body being formed at its one end portion with a plurality of mutually axial parallel blind bores and at its opposite end portion with a single axial blind bore, said opposite end being kept in engagement with the opposite end of one of said shoes; and
   f. a plurality of pistons slidably mounted in said parallel bores for providing a working chamber in each of said bores, said chambers being hydraulically connected with respective hydraulic pressure sources and the outer ends of said pistons being kept in pressure engagement with the opposite end of the other one of brakeshoes, said brakeshoes being brought into their expanded position by introducing pressure medium from respective hydraulic pressure sources into the respective working chambers for urging said pistons to move in their expanding sense, said opposite ends of the brakeshoes each having a plurality of rolling contact points for cooperation with said pistons and with said cylinder body, respectively.

2. A drum brake assembly, as defined in claim 1, wherein each of said expandable brakeshoes is formed with a plurality of arcuate projections acting as said contact points.

3. Drum brake assembly as claimed in claim 1, further comprising an adjusting means provided between the outer end of said cylinder body and the opposite end of said one brakeshoe for providing an adjustability of the clearance formed between said brakeshoes.

4. Drum brake assembly as claimed in claim 3, wherein said adjusting means comprises:
   a. A nut mounted concentrically and rotatably in the blind bore formed in the opposite end of said cylinder body, said nut having a threaded bore; and
   b. a bolt having threads kept in engagement with the female screw threads formed in said nut, the outer end of said bolt being kept in pressure engagement with the opposite end of said one brakeshoe.

5. A drum brake assembly for a powered vehicle provided with a plurality of wheels comprising:
   a. a backing plate for each of said wheels mounted fixedly on a nonrotatable part of said vehicle;
   b. a brakedrum rotatable with each of said wheels and mounted in proximity to said backing plate;
   c. anchor means mounted on said backing plate;
   d. a pair of expandable brakeshoes pivotably mounted at their respective one end to said anchor means;
   e. a single cylinder body mounted on said backing plate and slidably supported between the other ends of said brakeshoes, said cylinder body being formed at its one end portion with a plurality of mutually axial parallel blind bores and at its opposite end portion with a single axial blind bore, said opposite end being kept in engagement with the opposite end of one of said shoes; and
   f. a plurality of pistons slidably mounted in said parallel bores for providing a working chamber in each of said bores, said chambers being hydraulically connected with respective hydraulic pressure sources and the outer ends of said pistons being kept in pressure engagement with the opposite end of the other one of brakeshoes, said brakeshoes being brought into their expanded position by introducing pressure medium from respective hydraulic pressure sources into the respective working chambers for urging said pistons to move in their expanding sense, the end of said brakeshoe in engagement with said cylinder body being provided with a plurality of contact points disposed in coaxial alignment with said plurality of pistons respectively.